(12) United States Patent
Nefian

(10) Patent No.: US 7,171,043 B2
(45) Date of Patent: Jan. 30, 2007

(54) IMAGE RECOGNITION USING HIDDEN MARKOV MODELS AND COUPLED HIDDEN MARKOV MODELS

(75) Inventor: Ara V. Nefian, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 698 days.

(21) Appl. No.: 10/269,333

(22) Filed: Oct. 11, 2002

(65) Prior Publication Data

US 2004/0071338 A1    Apr. 15, 2004

(51) Int. Cl.
| | |
|---|---|
| G06K 9/62 | (2006.01) |
| G06K 9/00 | (2006.01) |
| G10L 15/00 | (2006.01) |
| G05B 13/02 | (2006.01) |

(52) U.S. Cl. .................. 382/159; 382/118; 700/47; 704/256.1

(58) Field of Classification Search ................. 382/159
See application file for complete search history.

(56) References Cited

U.S. PATENT DOCUMENTS

| | | | |
|---|---|---|---|
| 5,454,043 A | 9/1995 | Freeman | |
| 5,596,362 A | 1/1997 | Zhou | |
| 5,710,590 A | 1/1998 | Ichige et al. | |
| 5,754,695 A * | 5/1998 | Kuo et al. ................ | 382/228 |
| 5,850,470 A | 12/1998 | Kung et al. | |
| 5,887,069 A | 3/1999 | Sakou et al. | |
| 6,024,852 A | 2/2000 | Tamura et al. | |
| 6,072,494 A | 6/2000 | Nguyen | |
| 6,075,895 A | 6/2000 | Qiao et al. | |
| 6,108,005 A | 8/2000 | Starks et al. | |
| 6,128,003 A | 10/2000 | Smith et al. | |
| 6,184,926 B1 | 2/2001 | Khosravi et al. | |
| 6,185,529 B1 | 2/2001 | Chen et al. | |
| 6,191,773 B1 | 2/2001 | Maruno et al. | |
| 6,212,510 B1 | 4/2001 | Brand | |
| 6,215,890 B1 | 4/2001 | Matsuo et al. | |
| 6,219,639 B1 | 4/2001 | Bakis et al. | |
| 6,222,465 B1 | 4/2001 | Kumar et al. | |

(Continued)

FOREIGN PATENT DOCUMENTS

RU    2112273 C1    8/1995

(Continued)

OTHER PUBLICATIONS

Liang et al, Speaker Independent Audio-Visual Continuous Speech Recognition, Aug. 2002, Multimedia and Expo, vol. 2, p. 25-28.*

(Continued)

*Primary Examiner*—Joseph Mancuso
*Assistant Examiner*—Katheen Yuan
(74) *Attorney, Agent, or Firm*—Blakely, Sokoloff, Taylor & Zafman LLP

(57) ABSTRACT

An image processing system useful for facial recognition and security identification obtains an array of observation vectors from a facial image to be identified. A Viterbi algorithm is applied to the observation vectors given the parameters of a hierarchical statistical model for each object, and a face is identified by finding a highest matching score between an observation sequence and the hierarchical statistical model.

9 Claims, 5 Drawing Sheets

U.S. PATENT DOCUMENTS

| | | |
|---|---|---|
| 6,304,674 B1 | 10/2001 | Cass et al. |
| 6,335,977 B1 | 1/2002 | Kage |
| 6,385,331 B2 | 5/2002 | Harakawa et al. |
| 6,594,629 B1 | 7/2003 | Basu et al. |
| 6,609,093 B1 | 8/2003 | Gopinath et al. |
| 6,624,833 B1 | 9/2003 | Kumar et al. |
| 6,633,844 B1 | 10/2003 | Verma et al. |
| 6,678,415 B1 * | 1/2004 | Popat et al. ............ 382/226 |
| 6,751,354 B2 * | 6/2004 | Foote et al. ............ 382/224 |
| 6,816,836 B2 | 11/2004 | Basu et al. |
| 6,952,687 B2 | 10/2005 | Andersen et al. |
| 6,964,123 B2 | 11/2005 | Maes et al. |
| 2002/0036617 A1 | 3/2002 | Pryor |
| 2002/0093666 A1 | 7/2002 | Foote et al. |
| 2002/0102010 A1 | 8/2002 | Liu et al. |
| 2002/0135618 A1 | 9/2002 | Maes et al. |
| 2002/0140718 A1 | 10/2002 | Yan et al. |
| 2002/0161582 A1 | 10/2002 | Basson et al. |
| 2003/0123754 A1 | 7/2003 | Toyama |
| 2003/0144844 A1 | 7/2003 | Colmenarez et al. |
| 2003/0154084 A1 | 8/2003 | Li et al. |
| 2003/0171932 A1 | 9/2003 | Juang |
| 2003/0190076 A1 | 10/2003 | DeLean |

FOREIGN PATENT DOCUMENTS

| | | |
|---|---|---|
| RU | 2093890 C1 | 10/1997 |
| RU | 2112273 C1 | 5/1998 |
| WO | WO 00/36845 | 6/2000 |

OTHER PUBLICATIONS

Hennecke, et al: Automatic Speech Recognition System Using Acoustic and Visual Signals, IEEE, 1996.
Dupont et al: Audio-Visual Speech Modeling for Continuous Speech Recognition, Sep. 2000, IEEE Transactions on Multimedia, vol. 2, No. 3, pp. 141-151.
Potamianos et al: An Image Transform Approach for HMM Based Automatic Lipreading, Proc. Int. conf. Image Processing, 1998.
Logan et al: Factorial Hidden Markov Models for Speech Recognition: Preliminary Experiments; Cambridge Research Laboratory; Technical report Series; CRL 97/7; 9- 1997.
Dugad: Tutorial on Hidden Markov Models; Technical Report No.: SPANN-96, May 1996, pp. 1-6.
Brand: Coupled Hidden Markov Models for Modeling Interacting Processes; Learning and Common Sense Tech Report 405, Jun 3, 1997, MIT Media Lab Perceptual Computing.
Nefian et al: An Embedded HMM-Based Approach for Face Detection and Recognition; IEEE Int'l Conf on Acoustics, Speech and Signal Processing, Mar. 15-19, 1999; p. 3553-3556.
Nefian: Embedded Bayesian Networks for Face Recognition; IEEE In'tl Conference on Multimedia and Expo; IEEE vol. 2, Aug. 26, 2002, pp. 133-136.
Kennedy, et al: Identification of Coupled Markov Chain Model with Application; 31st IEEE Conference on Decision and Control, Dec. 16-18, 1992; vol. 4, pp. 3529.
Ramesh, et al: Automatic Selection of Tuning Parameters for Feature Extraction Sequences; IEEE Comp Society Conf on Comp Vision and Pattern Recognition; Jun. 21-23, 1994, pp. 672-677.
Potamianos et al: Linear Discriminant Analysis for Speechreading; IEEE Workshop on Multimedia Processing, Dec. 1998.
Chan: HHH-Based Audio-Visual Speech Recognition Integrating Geometric and Appearance-Based Visual Features, IEEE 2001.
Pavlovic: Dynamic Bayesian Networks for Information Fusion with Applications to Human-Computer Interfaces; Thesis, Univ of Urbana-Champaign, 1999, pp. iii-ix &.
Rezek, et al: Coupled Hidden Markov Models for Biosignal Interaction; Advances in Medical Signal and Information Processing, Sep. 4-6, 2000; pp. 54-59.
Pavlovic: Multimodal Tracking and Classification of Audio-Visual Features; 1998 Int'l Conference on Image Processing, ICIP Proceedings; Oct. 4-7, 1998, vol. 1; pages.
Kristjansson, et al: Event-Coupled Hidden Markov Models; 2000 IEEE Int'l Conference on Multimedia and Expo, Jul. 30-Aug. 2, 2000; vol. 1; pp. 385-388.
Rezek, et al: Coupled Hidden Markov Models for Biosignal Interaction; Advances in Medical Signal and Information Processing, Sep. 4-6, 2000; pp. 54-59.
Fu, et al: Audio-Visual Speaker Identification Using Coupled Hidden Markov Models; 2003 Int'l Conference on Image Processing (ICIP), Sep. 14-17, 2003; vol. 2, pages.
Nefian, et al: A Coupled HMM for Audio-Visual Speech Recognition; IEEE Int'l Conf on Acoustics, Speech, and Signal Processing, vol. 3 of 4, May 13-17, 2002, pages.
Wikipedia, definition of Hidden Markov Model, 3 pages.
Wikipedia, definition of Viterbi Algorithm, 5 pages.
Rezek, et al: Learning Interaction Dynamics with Coupled Hidden Markov Models; IEEE Science, Measurement and Technology, Nov. 2000; vol. 147, Issue 6; pages.
U.S. Appl. No. 10/143,459, filed May 23, 2006.
U.S. Appl. No. 10/142,447, filed May 17, 2006.
U.S. Appl. No.: 10/269,381 filed Jan. 6, 2003 Final Office Action dated Jul. 11, 2006.
U.S. Appl. No.: 10/143,459 filed May 9, 2002 Office Action dated May 23, 2006.
Pending U.S. Appl. No.: 10/143,459 filed May 9, 2002 inventor: Liang; Office Action dated Oct. 31, 2006.
Wikipedia: Definition of LInear Discriminant Analysis.
NETI et al.: Large-Vocabulary Audio-Visual Speech Recognition: A Summary of the Johns Hopkins Summer 2000 Workshop.
Luettin et al.; Asynchronous Stream Modelling for Large Vocabulary Audio-Visual Speech Recognition, Proceedings of the 2001 IEEE Int'l Conference of Acoustics, Speech and Signal Processing (ICASSP'01), May 7-11, 2001, pp. 169-172.
Gordan: A Temporal Network for Support Vector Machine Classifiers for the Recognition of Visual Speech, Methods and Applications of Artificial Intelligence: Proceedings of the 2nd hellenic Conference on AI (SETN 2002), Thessaloniki, Greece, Apr. 11-12, 2002, pp. 355-365.
Ming-Husan Yang et al.: Detecting Faces in Images: A Survrey, IEEE trans Pattern Analysis and Machine Intelligence, vol. 24, No. 1, Jan. 2002, pp. 34-58.
Yongmin Li et al.: Multi-view Face Detection Using Support Vector Machines and Eigenspace Modelling, Proceedings on the Int'l Conference on Knowledge-based Intelligent Engineering Systems and
Batra: Modeling and Efficient Optimization for Object-Based Scalability and Some Related Problems, IEEE Transactions onImage processing, vol. 9, No. 10, Oct. 10, 2000, pp. 1677-1692.
Pending U.S. Appl. No.: 10/326,368 (Attorney Docket No.: 42P14472); Office Action dated Jul. 25, 2006.

* cited by examiner

IMAGE RECOGNITION USING HIDDEN MARKOV MODELS AND COUPLED HIDDEN MARKOV MODELS

FIELD OF THE INVENTION

The present invention relates to image recognition. More particularly, the present invention relates to improved Bayesian networks for image classification.

BACKGROUND

Identifying a specific object from an image is a pattern recognition task performed at least in a two-dimensional feature space (multispectral techniques can add additional dimensions). This can include character recognition, object detection, or image analysis. Image identification and pattern recognition tasks are particularly necessary for identification and security applications, including identification and analysis of facial features and visual tracking of individuals.

Facial analysis can include facial feature extraction, representation, and expression recognition. Available facial analysis systems are currently capable of discriminating among different facial expressions, including lip and mouth position. Unfortunately, many such available systems require substantial manual input for best results, especially when low quality video systems are the primary data source. Previous approaches for face recognition have been based on geometric measurements (which can require substantial normalization efforts), template based methods (which have substantial updating problems), and modelling methods (which have accuracy issues).

BRIEF DESCRIPTION OF THE DRAWINGS

The inventions will be understood more fully from the detailed description given below and from the accompanying drawings of embodiments of the inventions which, however, should not be taken to limit the inventions to the specific embodiments described, but are for explanation and understanding only FIG. 1 schematically illustrates an image classification system.

DETAILED DESCRIPTION

Figure 1:
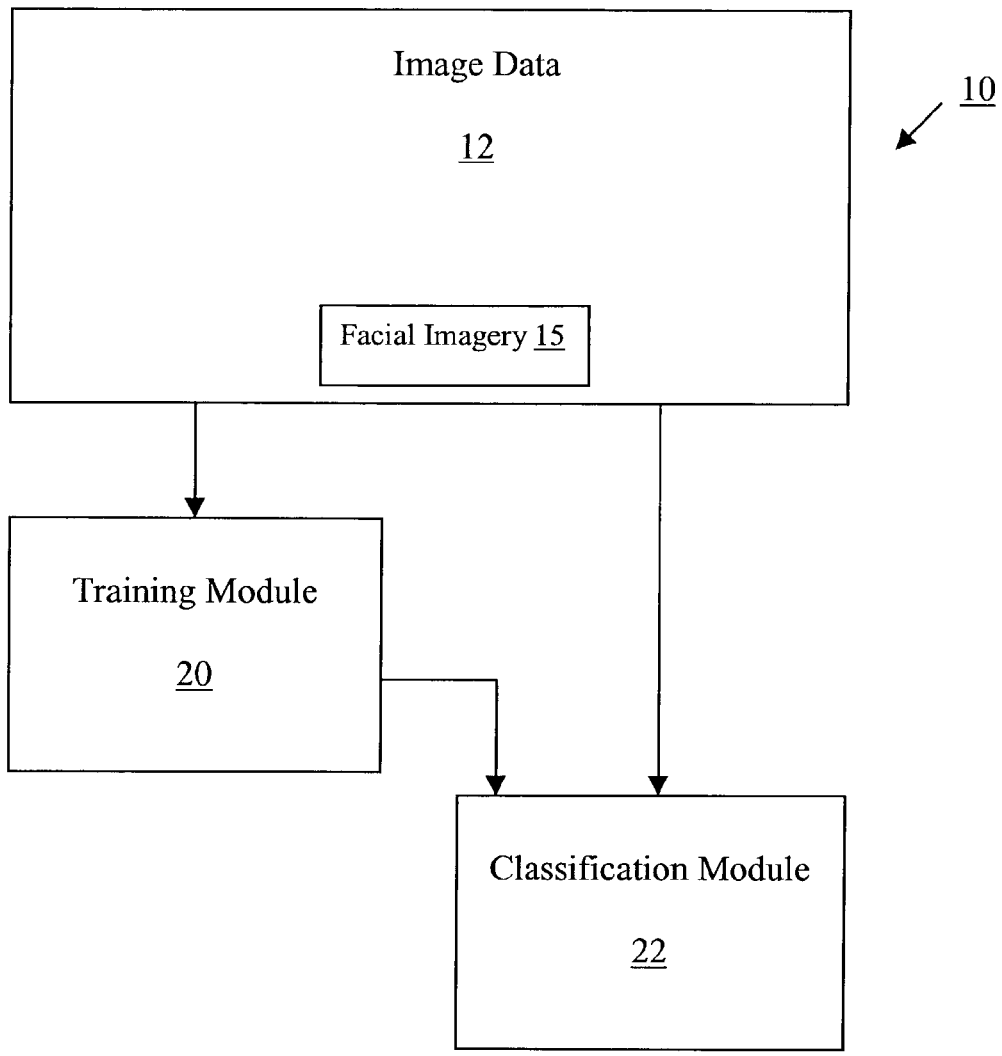

FIG. 1 generally illustrates a system 10 for data analysis of a data set 12 using an embedded Bayesian network that includes a hidden Markov model (HMM) and a coupled hidden Markov model (CHMM). A embedded Bayesian network is used because it has good generalization performance even for high dimensional input data and small training sets.

The data set 12 can include static or video imagery 14 containing objects to be identified or classified, including but not limited to textual characters, ideographs, symbols, fingerprints, or even facial imagery 15. The same data set can be optionally used both to train and classify data with the appropriate training module 20 and classification module 22.

The processing procedure for system 10 may be performed by a properly programmed general-purpose computer alone or in connection with a special purpose computer. Such processing may be performed by a single platform or by a distributed processing platform. In addition, such processing and functionality can be implemented in the form of special purpose hardware, custom application specific integrated circuits (ASICs), configurable FPGA circuits, or in the form of software or firmware being run by a general-purpose or network processor. Data handled in such processing or created as a result of such processing can be stored in any memory as is conventional in the art. By way of example, such data may be stored in a temporary memory, such as in the RAM of a given computer system or subsystem In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 2:
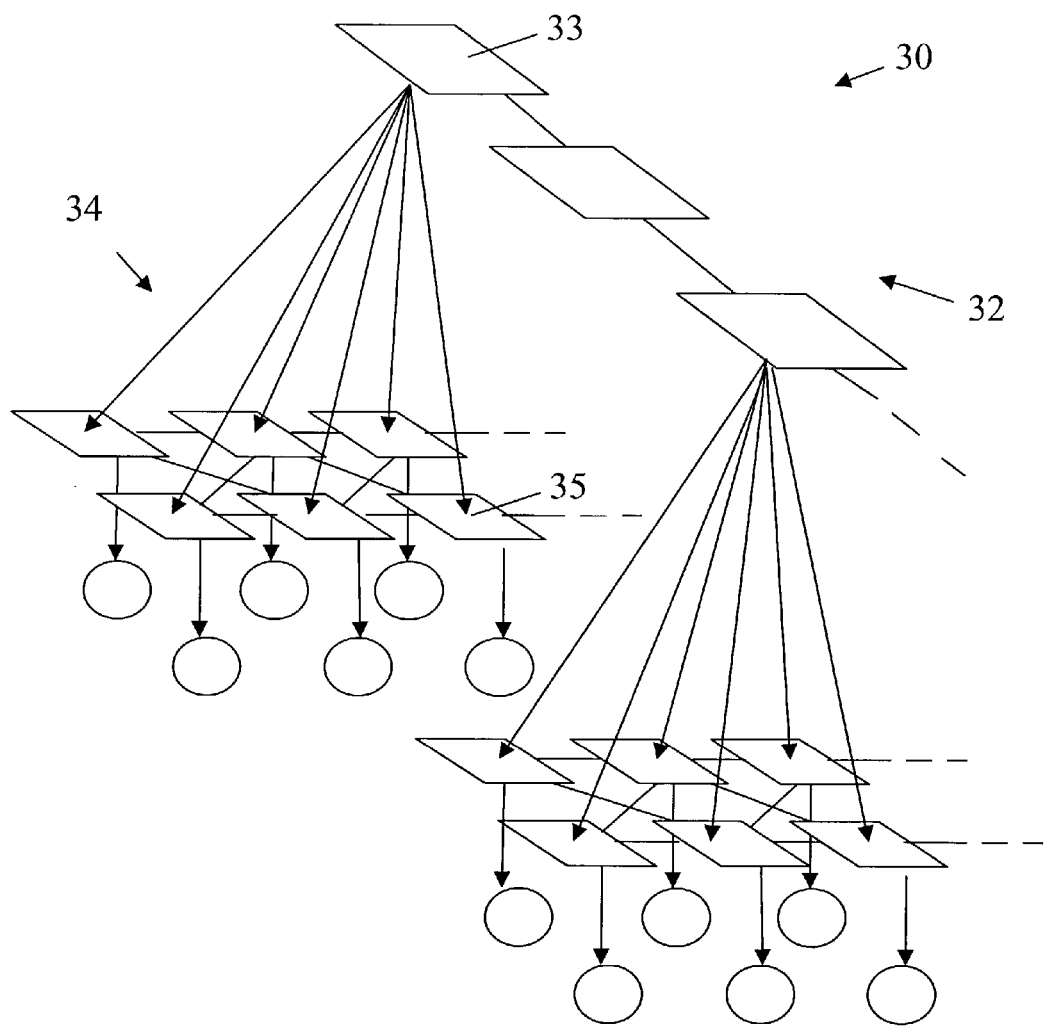
FIG. 2 generically illustrates an embedded hidden Markov model-coupled hidden Markov model (HMM-CHMM) structure.

FIG. 2 generically illustrates a logical structure 30 of an embedded hidden Markov model-coupled hidden Markov model (HMM-CHMM). As seen in FIG. 2, HMM-CHMM is a hierarchical statistical model that includes a HMM parent layer 32 (collectively formed from nodes 33) and a CHMM child layer 34 (collectively formed from nodes 35). The child layer 34 associates one CHMM node 35 to each node 33 in the parent layer 32, and the parameters of the individual C remain independent from each other. Instead, the parameters of each child layer CHMM depend upon the state of the connected parent node 33. Typically, for multidimensional data sets, the HMM in the parent layer 32 is associated with at least one dimension, and the G child layers are associated with data in an orthogonal dimension with respect to the parent layer.

Formally defined, the elements of an embedded HMM-CHMM have: an initial super state probability $\pi_{0,0}$ and a super state transition probability from super state j to super state i, $a_{0,i|j}$, where super state refers to the state of the parent layer 32 HMM node 33.

For each super state k the parameters of the corresponding CHMM are defined to have an initial state probability in a channel of $$c = 1, \ldots, C_1, \pi_{1,0}^{k,c};$$

a state transition probability from state sequence j to state:

$$i_c, a_{1,i_c|j}^{k,c};$$

and an observation probability:

$$b_{t_0,t_1}^{k,c}(j_c).$$

In a continuous mixture with Gaussian components, the probability of the observation vector O is given by:

$$b^{k,c}(j_c) = \sum_{m=1}^{M_j^{k,c}} \omega_{j,m}^{k,c} N(O, \mu_{j,m}^{k,c}, U_{j,m}^{k,c})$$

where $$\mu_{j,m}^{k,c}$$

and $$U_{j,m}^{k,c}$$

are the mean and covariance matrix of the mth mixture of the Gaussian mixture corresponding to the jth state in the cth channel, $$M_j^{k,c}$$

is the number of mixtures corresponding to the jth state of the cth channel, and $$\omega_{j,m}^{k,c}$$

is a weight associated with the corresponding mixture.

Observation sequences are used to form observation vectors later used in training and classifying. For example, the observation sequence for a two-dimensional image may be formed from image blocks of size $L_x \times L_y$ that are extracted by scanning the image from left-to-right and top-to-bottom. Adjacent image blocks may be designed to have an overlap by $P_y$ rows in the vertical direction and $P_x$ columns in the horizontal direction. In one possible embodiment, with blocks size of $L_y$=8 rows and $L_x$=8 columns, a six DCT coefficients (a 3×2 low-frequency array) may be employed to create the overlap.

The resulting array of observation vectors may correspond to size of $T_0 \times T_1$, where $T_0$ and $T_1$ are the number of observation vectors extracted along the height (H) and the width (W) of the image, respectively. $T_0$ and $T_1$ may be computed accordingly as:

$$T_0 = \frac{H - L_y}{L_y - P_y} + 1,$$

$$T_1 = \frac{W - L_x}{L_x - P_x} + 1$$

Consecutive horizontal and vertical observation vectors may also be grouped together to form observation blocks. This may be used as a way to consolidate local observations and at the same time to reduce the total amount of observations. In practice, this data grouping serves application needs and improve recognition efficiency.

To compute the number of observation blocks, denote the number of observation blocks in the vertical and horizontal direction be $T_0^0$ and $T_1^0$, respectively. Then, $$T_0^0 = 1$$

$$T_1^0 = \frac{T_1}{C_1}$$

In addition, denote the number of observation vectors in the horizontal and vertical direction within each observation block by $T_0^1$ and $T_1^1$, respectively, where $$T_0^1 = T_1$$

$$T_1^1 = C_1$$

Furthermore, denote $O_{t0,t1,c}$ as the $t_1$th observation vector corresponding to the cth channel within the observation block $t_0$.

Although any suitable state sequence segmentation can be used, a modified Viterbi algorithm for the HMM-CHMM is preferred. Application of this modified Viterbi algorithm determines the optimal state and super state segmentation of the observation sequence. The best super state probability for the observation block $t_0$ given super state i of super channel s, is denoted as $P_{t_0}(i)$. Corresponding optimal state and optimal state sequence $\beta_{t0,t1,c}(i)$ may then be computed for each super observation. The following states are first initialized:

$$\delta(i) = \pi_{0,0}(i) P_{t_0}(i)$$

$$\psi_0(i) = 0$$

The following states are then recursively determined:

$$\delta_{t_0}(i) = \max_j \{\delta_{t_0-1}(j) a_{0,ij} P_{t_0}(i)\}$$

$$\psi_{t_0}(i) = \arg \max_j \{\delta_{t_0-1}(j) a_{0,ij} P_{t_0}(i)\}$$

The termination condition is then computed:

$$P = \max_i \{\delta_{T_0}(i)\}$$

$$\alpha_{T_0} = \arg \max_i \{\delta_{T_0}(i)\}$$

Based on the computed termination condition, a backtracking operation is performed:

$$\alpha_{T_0} = \psi_{0,t+1}(\alpha_{T_0+1})$$

$$q_{t_0,t_1,c}^0 = \alpha_{t_0}$$

$$q_{t_0,t_1,c}^1 = \beta_{t_0,t_1,c}(\alpha_{t_0})$$

Figure 3:
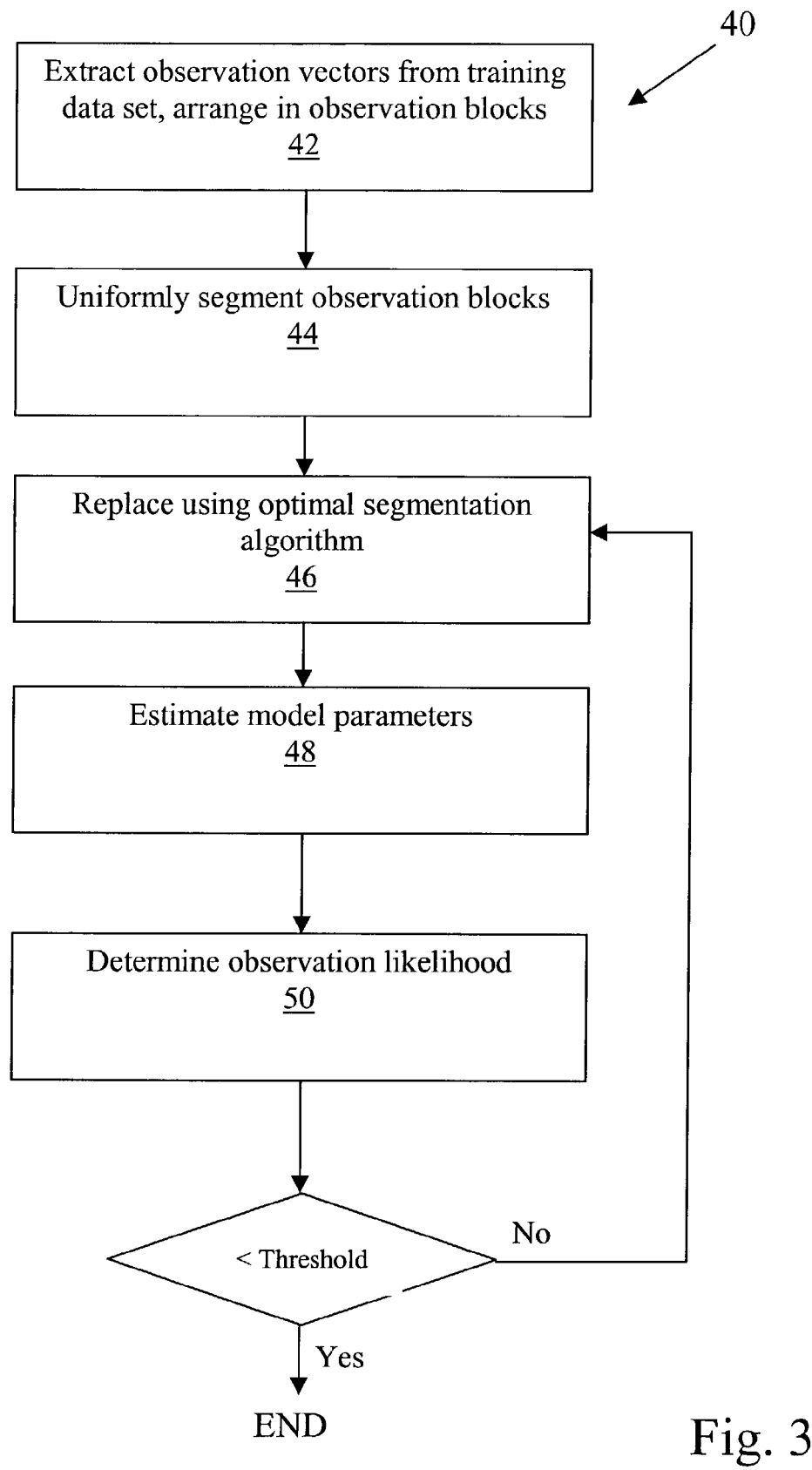
FIG. 3 is a flow diagram illustrating training of an embedded HMM-CHMM.

FIG. 3 is a flow diagram 40 illustrating training of an embedded HMM-CHMM based on the Viterbi algorithm, according to embodiments of the present invention. To train an HMM-CHMM based on given training data, observation vectors are first extracted from the training data set and organized in observation blocks (module 42). These observation blocks are uniformly segmented (module 44), replaced by an optimal state segmentation algorithm (module 46), have their model parameters estimated (module 48), and observation likelihood determined (module 50). As will be appreciated, the training may be iterative, with each training data set used individually and iteratively to update model parameters until the observation likelihood computed is smaller than a specified threshold.

More specifically, the training data set may be segmented along a first dimension according to the number of super states, into a plurality of uniform segments each of which corresponding to a super state. Based on the uniform segmentation at the super layer, the observation vectors within each uniform segment may then be uniformly segmented according to the number of channels and number of states of each child CHMM.

The density function of each state (including both super states as well as child states) may be initialized before the training takes place. For example, if Gaussian mixture model is adopted for each state, Gaussian parameters for each of the mixture component may need to be initialized. Different approaches may be employed to achieve the initialization of model parameters. For example, one embodiment may be implemented where the observation sequence assigned to each channel c and state j, and super state k and super channel s may be assigned to $$M_j^{k,c}$$

clusters using, for example, the K-means algorithm.

During the process of training, the original uniform segmentation is updated based on the optimal state segmentation using the Viterbi algorithm or other suitable algorithms. To update the density function of a state, particular relevant parameters to be updated may be determined prior to the update operation.

The selection of a Gaussian mixture component for each state j channel c and super state k is also required. One exemplary criterion to make the selection may correspond to assigning the observation $$O_{t_0,t_1,c}^{(r)}$$

from the rth training sample in the training set to the Gaussian component for which the Gaussian density function $$N(O_{t_0,t_1,c}^{(r)}; \mu_{j,m}^{k,c}, U_{j,m}^{k,c})$$

is the highest.

The parameters are then estimated using, for example, an extension of the segmental K-means algorithm. In particular, the estimated transition probability $a'_{0,i_s|j}$ between super states $i_s$ and j may be obtained as follows:

$$a'_{0,i|j} = \frac{\sum_r \sum_{t_0} \sum_{t_1} \in_{t_0}^{(r)}(i,j)}{\sum_r \sum_{t_0} \sum_{t_1} \sum_l \in_{t_0}^{(r)}(i,l)}$$

where $$\in_{t_0}^{(r)}(i,l)$$

may equal to one if a transition from super state 1 to the super state i occurs for the observation block ($t_o$) and zero otherwise. The estimated transition probabilities $$a'^{k,c}_{1,i_c|j}$$

from embedded state sequence j to the embedded state $i_c$ in channel c of super state k may then be obtained as follows, $$a'^{k,c}_{1,i_c|j} = \frac{\sum_r \sum_{t_0} \sum_{t_1} \theta_{t_0,t_1}^{(r)}(k,c,i_c,j)}{\sum_r \sum_{t_0} \sum_{t_1} \sum_l \theta_{t_0,t_1}^{(r)}(k,c,i_c,l)}$$

where $$\theta_{t_0,t_1}^{(r)}(s,k.c,i_c,l)$$

may be one if in the observation block ($t_o$) from the rth training sample a transition from state sequence i to state $i_c$ in channel c occurs for the observation $$O_{t_0,t_1,c}^{(r)}$$

and zero otherwise.

The parameters of the selected Gaussian mixture component may also be accordingly updated. The involved Gaussian parameters may include a mean vector $$\mu_{j,m}^{\prime k,c},$$

a covariance matrix $$U_{j,m}^{\prime k,c}$$

of the Gaussian mixture, and the mixture coefficients $$\omega_{j,m}^{\prime k,c}$$

for mixture m of state j channel c and super state k The updated Gaussian parameters may be obtained according to the following formulations:

$$\mu'^{k,c}_{j,m} = \frac{\sum_r \sum_{t_0} \sum_{t_1} \psi^{(r)}_{t_0,t_1}(k,c,j,m) O^{(r)}_{t_0,t_1,c}}{\sum_r \sum_{t_0} \sum_{t_1} \psi^{(r)}_{t_0,t_1}(k,c,j,m)}$$

$$U'^{k,c}_{j,m} = \frac{\sum_r \sum_{t_0} \sum_{t_1} \psi^{(r)}_{t_0,t_1}(k,c,j,m)(O^r_{t_0,s,t_1c} - \mu'^{k,c}_{j,m})(O^{(r)}_{t_0,t_1,c} - \mu'^{k,c}_{j,m})^t}{\sum_r \sum_{t_0} \sum_{t_1} \psi^{(r)}_{t_0,t_1}(k,c,j,m)}$$

$$\omega'^{k,c}_{j,m} = \frac{\sum_r \sum_{t_0} \sum_{t_1} \psi^{(r)}_{t_0,t_1}(k,c,j,m)}{\sum_r \sum_{t_0} \sum_{t_1} \sum_{m=1}^{M} \psi^{(r)}_{t_0,t_1}(k,c,j,m)}$$

where $$\psi^{(r)}_{t_0,t_1}(k,c,j,m)$$

may equal to one if the observation $$O^{(r)}_{t_0,t_1,c}$$

is assigned to super state k, state j in channel c and mixture component m, and zero otherwise.

The update of parameters based on a training sample may be carried out iteratively This may be necessary because the Viterbi algorithm may yield different optimal segmentation during each iteration before convergence. Between two consecutive iterations, if the difference of observation likelihood computed with the Viterbi algorithm is smaller than a specified threshold, the iteration may be terminated. The HMM-CHMM corresponds to a complexity of quadratic with respect to the number of states in the model. In addition, HMM-CHMM may be efficiently implemented in a parallel fashion.

Figure 4:
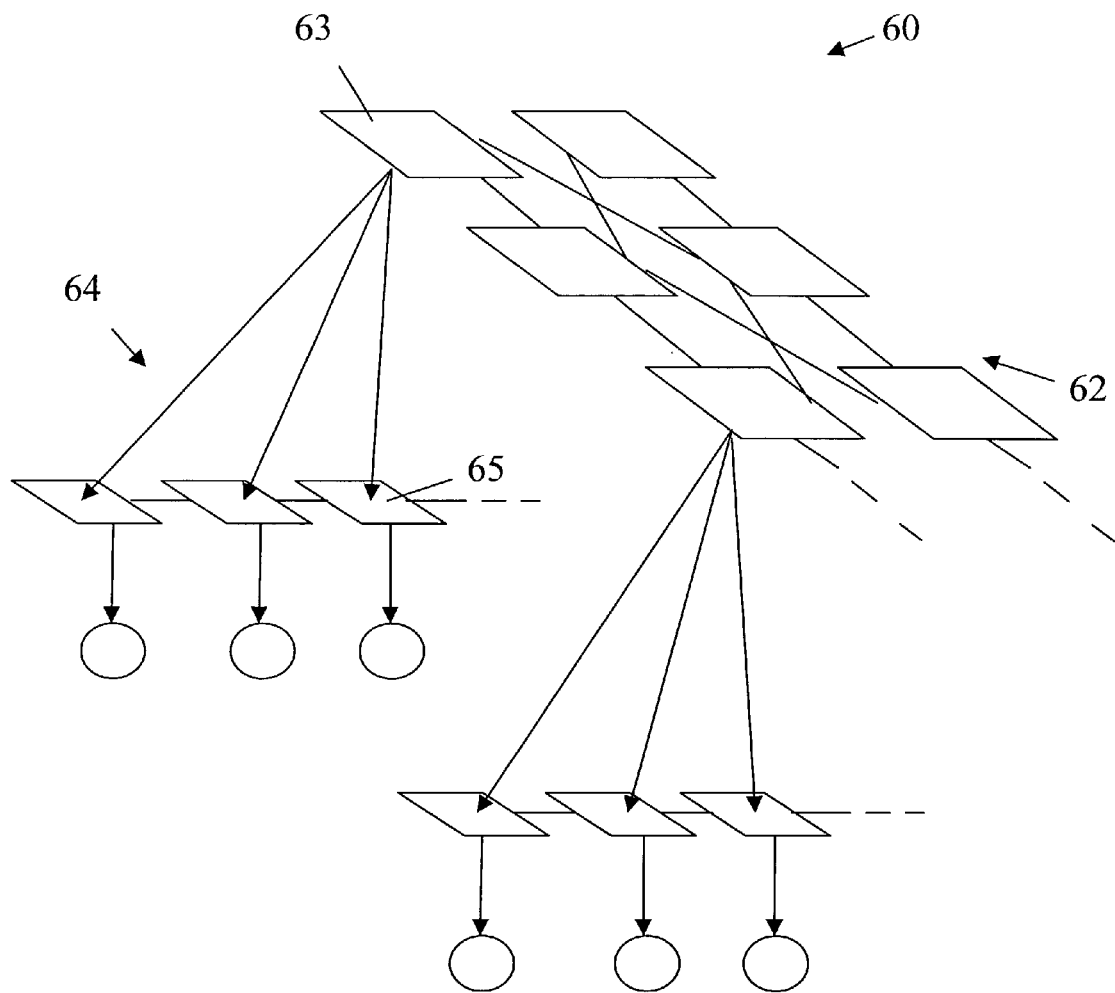
FIG. 4 generically illustrates an embedded coupled hidden Markov model- hidden Markov model (CHMM-HMM) structure.

An alternative logical structure that includes an embedded CHMM-HMM (in contrast to an HMM-CHMM) is generically illustrated by FIG. 4. As seen in that Figure, a logical structure 60 of an embedded hidden Markov model-coupled hidden Markov model. As seen in FIG. 4, the CHMM-HMM is a hierarchical statistical model that includes a CHMM parent layer 62 (collectively formed from nodes 63) and a HMM child layer 64 (collectively formed from nodes 65). The child layer 64 associates one HMM node 65 to each node 63 in the parent layer 62, and the parameters of the individual HHMs remain independent from each other. Instead, the parameters of each child layer HMM depend upon the state of the connected parent node 63. Typically, for multidimensional data sets, the CHMM in the parent layer 62 is associated with at least one dimension, and the HMM child layers are associated with data in an orthogonal dimension with respect to the parent layer. With appropriate changes, training of the CHMM-HMM can proceed in a manner similar to that discussed in reference to training of HMM-CHMM image recognition systems.

Figure 5:
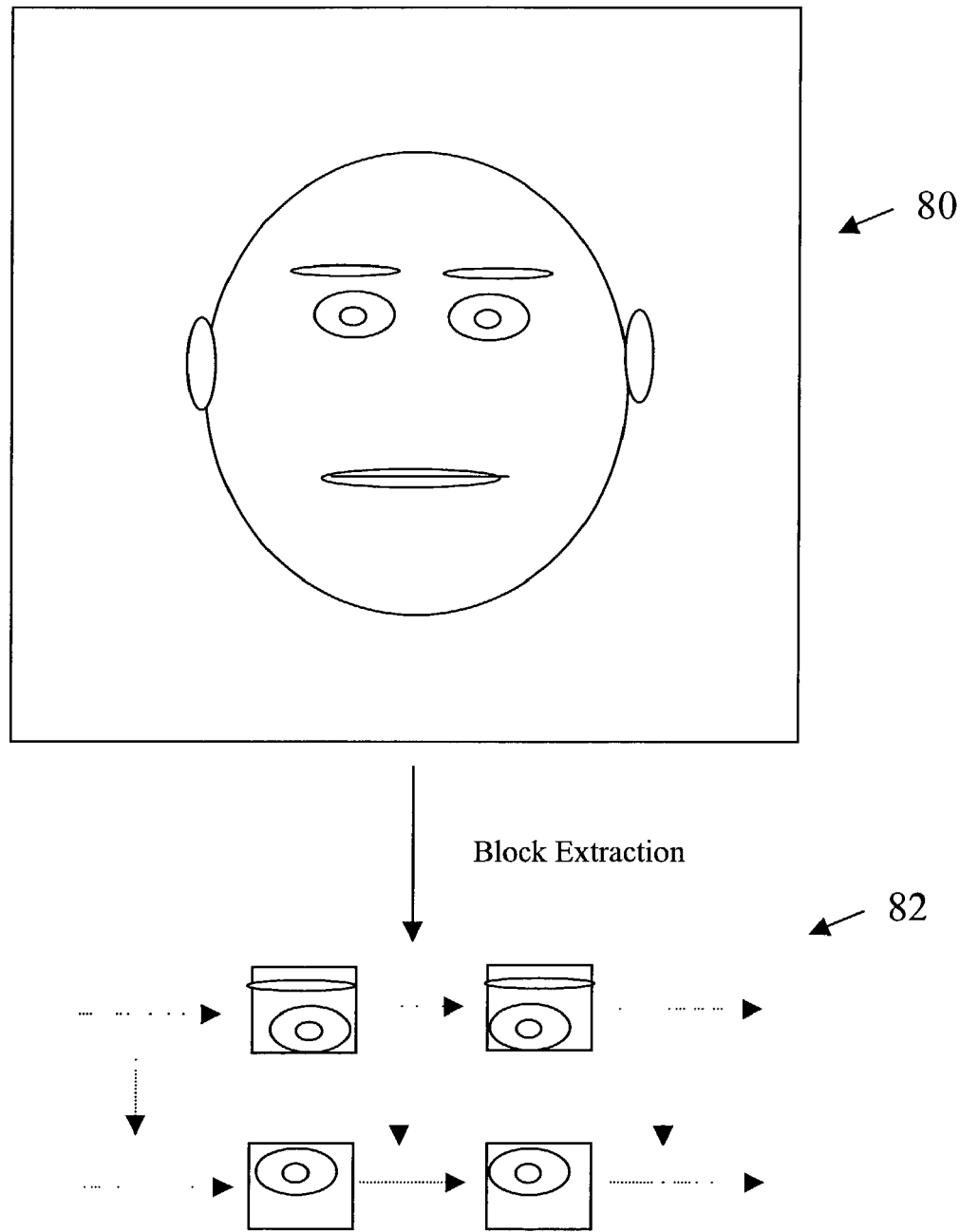
FIG. 5 is a cartoon illustrating block extraction for a facial image.

In one embodiment of face image parameterization and observation blocks extraction illustrated with respect to FIG. 5, a facial image 80 (represented as a cartoon face in the Figure) is the image analysis target. Observation are formed from 8×8 image blocks extracted by scanning the image from left-to-right and top-to-bottom. Adjacent image blocks 82 overlap in the horizontal and vertical directions, and six DCT coefficients (a 3×2 low-frequency array) are be employed to create the overlap. The resulting array of observation vectors correspond to size of $T_0 \times T_1$, where $T_0$ and $T_1$ are the number of observation vectors extracted along the height (H) and the width (W) of the image, respectively. $T_0$ and $T_1$ may be computed as earlier described with reference to observation vector calculation.

Training proceeds by creating a face model formed by defining two (2) channels in the CHMM and five (5) super states in the HMM supporting each of the CHMM channels. The number of super states in the HMM and in each CHMM is set to three (3), and all covariance matrices are diagonal. Images used in training correspond to multiple instances of the same person. Given a new person not previously found in the database, and not used in previous training of the model, the observation vectors are determined, and the Viterbi algorithm is applied to the observation sequence given the parameters of each of the embedded HMM-CHMM. The highest matching score between the observation sequence and the trained face models identify the test image. Using a standard facial image database, training on 10 images per person, and using five different face images for testing, recognition rates greater than 80% have been achieved.

Since non-intrusive video or picture based security systems are frequently able to provide distinguishable pictures of faces from various angles, the ability to provide high probability personal identification from face imagery is valuable for security and tracking purposes. The method of the present invention can be decomposed for efficient implementation in parallel architecture systems, and since it has a complexity that varies quadratically (rather than exponentially with the number of states of the model, large state models can be maintained.

As will be understood, reference in this specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Accordingly, it is the following claims, including any amendments thereto, that define the scope of the invention.

The claimed invention is:

1. An image processing method, comprising:
    forming from multiple images a hierarchical statistical model for each object to be identified in an image training database, the hierarchical statistical model having a parent layer with multiple supernodes associated with a first image direction and a child layer having multiple nodes associated with each supernode of the parent layer and a second image direction, wherein the parent layer is formed from a hidden Markov model (HMM) and the child layer is formed from a coupled hidden Markov model (CHMM), or the parent layer is formed from a CHMM and the child layer is formed from an HMM;

obtaining an array of observation vectors from an image to be identified; and applying a Viterbi algorithm to the observation vectors given parameters of the hierarchical statistical model for each object, and identifying an object by finding a highest matching score between an observation sequence and hierarchical statistical model.

2. The method according to claim 1, wherein the objects are faces.

3. The method according to claim 1, further comprising estimating the parameters of the hierarchical statistical model based on the multiple images.

4. An article comprising a storage medium having stored thereon instructions that when executed by a machine result in:

forming from multiple images a hierarchical statistical model for each object to be identified in an image training database, the hierarchical statistical model having a parent layer with multiple supernodes associated with a first image direction and a child layer having multiple nodes associated with each supernode of the parent layer and a second image direction, wherein the parent layer is formed from a hidden Markov model (HMM) and the child layer is formed from a coupled hidden Markov model (CHMM), or the parent layer is formed from a CHMM and the child layer is formed from an HMM;

obtaining an array of observation vectors from an image to be identified; and applying a Viterbi algorithm to the observation vectors given parameters of the hierarchical statistical model for each object, and identifying an object by finding a highest matching score between an observation sequence and hierarchical statistical model.

5. The article of claim 4, wherein the objects are faces.

6. The article of claim 4, wherein the instructions that when executed by a machine further result in estimating the parameters of the hierarchical statistical model based from the multiple images.

7. An image processing system comprising:

an image training database having a hierarchical statistical model for each object to be identified, the hierarchical statistical model having a parent layer with multiple supernodes associated with a first image direction and a child layer having multiple nodes associated with each supernode of the parent layer and a second image direction, wherein the parent layer is formed from a hidden Markov model (HMM) and the child layer is formed from a coupled hidden Markov model (CHMM), or the parent layer is formed from a CHMM and the child layer is formed from an HMM; and a classification module that obtains an array of observation vectors from an image to be identified and tests it for identity against the image training database by applying a Viterbi algorithm to the observation vectors given parameters of the hierarchical statistical model for each object, and identifying an object by finding a highest matching score between an observation sequence and the hierarchical statistical model in the image training database.

8. The image processing system according to claim 7, wherein the objects are faces.

9. The image processing system according to claim 7, further comprising a training module to estimate the parameters of the hierarchical statistical model based on the image training database.

* * * * *